Patented Oct. 12, 1943

2,331,377

UNITED STATES PATENT OFFICE 2,331,377

AMINOPLAST

Gaetano F. D'Alelio, Pittsfield, Mass., assignor to General Electric Company, a corporation of New York No Drawing. Application February 26, 1941,
Serial No. 380,672

17 Claims. (Cl. 260—33)

This invention relates to new and useful compositions having properties that render them particularly useful in the plastics and coating arts. Specifically the invention is concerned with compositions of matter comprising an aminoplast (more particularly heat-curable and heat-cured aminoplasts) modified with at least one compound of the class consisting of (1) salts (organic and inorganic) of nuclearly poly-substituted carbocyclic compounds wherein at least one of the nuclear substituents is a grouping represented by the formula

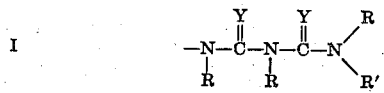

and at least one of the other nuclear substituents is a grouping represented by the formula

R and R' in each of the above formulas representing a member of the class consisting of hydrogen and monovalent organic radicals (more particularly monovalent hydrocarbon radicals) but at least one R' being hydrogen, at least one Y representing the grouping =NH and the other Y representing a member of the class consisting of oxygen, sulfur, selenium and the grouping =NR'', where R'' has the same meaning as R; and (2) the aldehyde-reaction products of the salts of (1).

More specific examples of compounds with which heat-curable (including potentially heat-curable) aminoplasts are modified in accordance with the present invention are the salts, and the aldehyde-reaction products of salts, of nuclearly poly-substituted carbocyclic compounds wherein at least one of the nuclear substituents is a grouping represented by the formula

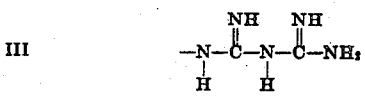

and at least one of the other nuclear substituents is a grouping represented by the formula

for instance the organic and inorganic salts of the biguanido benzene sulfonamides. More specific examples of such salts are the organic salts, e. g., the oxalates, acetates, acrylates, tartrates, citrates, camphorates, etc., and the inorganic etc., of mono-, di-, tri-, tetra- and penta-(biguanido) benzene monosulfonamides, the mono-(biguanido) benzene di-, tri-, tetra- and penta-sulfonamides, the di-(biguanido) benzene di-, tri- and tetra-sulfonamides, the tri-(biguanido) benzene di- and tri-sulfonamides and tetra-(biguanido) benzene disulfonamide.

Other examples of biguanido carbocyclic sulfonamides, the salts and the aldehyde-reaction products of the salts of which may be used in carrying the present invention into effect, are the oxybiguanido benzene sulfonamides, which also may be named the (carbamyl guanido) benzene sulfonamides, the thiobiguanido benzene sulfonamides, which also may be named the (thiocarbamyl guanido) benzene sulfonamides, and the selenobiguanido benzene sulfonamides, which also may be named the (selenocarbamyl guanido) benzene sulfonamides. These oxy, thio and seleno derivatives may contain varying numbers of biguanido and sulfamyl radicals attached to the benzene nucleus as described above with particular reference to the biguanido benzene sulfonamides. Other examples of biguanido carbocyclic sulfonamides are the cycloaliphatic (cycloalkane and cycloalkene) derivatives, the naphthalene derivatives, the anthracene derivatives, etc., e. g., the biguanido, (carbamyl guanido), (thiocarbamyl guanido) and (selenocarbamyl guanido), cycloaliphatic sulfonamides, the biguanido, (carbamylguanido), (thiocarbamyl guanido) and (selenocarbamyl guanido) naphthalene sulfonamides, the biguanido, (carbamyl guanido), (thiocarbamyl guanido) and (selenocarbamyl guanido) anthracene sulfonamides, etc. In these carbocyclic compounds the number of biguanido and sulfamyl radicals attached to the carbocyclic nucleus may range from one each such radical to the combining power of the particular carbocyclic nucleus, that is, to the number of replaceable hydrogen atoms in the carbocyclic nucleus.

As is well known, aminoplasts are synthetic resins derived from amino (including imino) or amido (including imido) compounds, a typical example being urea-formaldehyde resin (reference: Modern Plastics, vol. 17, No. 2, October, 1939, page 433; U. S. Patent 2,214,851—D'Alelio). Other examples of aminoplasts are aminotriazine-aldehyde resins (e. g., melamine-formaldehyde resins), urea-aminotriazine-aldehyde resins, resinous reaction products of aldehydes with guanazoles, aminodiazoles, aminotriazoles or aminodiazines, aniline-aldehyde resins, proteindensation products of aldehydes such as formaldehyde with maleic diamide, malonic diamide, fumaric diamide, itaconic diamide, etc. Such products in partly condensed state are potentially thermosetting compounds and, in cured or heat-hardened state, may be ejected from hot molds.

In the commercial utilization of aminoplasts in the plastics and coating arts, it is frequently necessary to modify the potentially heat-curable aminoplast by incorporating therein a plasticizer in order that the aminoplast will flow properly in the particular coating composition or, in the case of thermosetting aminoplast molding compositions, will show good flow characteristics during molding. If improper or insufficient plastic flow occurs during the molding operation, the molded articles may show streaked or wavy surfaces. Furthermore, if the plasticity of the molding composition is not sufficient, lack of physical homogeneity as the result of incompletely knitted granules often characterizes massive moldings.

From the foregoing it will be seen that particularly in the molding of heat-curable, plasticized aminoplasts it is important that the plasticizer have certain physical characteristics. It should improve the flow of the molding compound during molding without retarding the curing of the resin at molding temperatures. It should be compatible with the aminoplast both at normal and at elevated temperatures and should not "bleed" from the aminoplast during or after molding. It should not objectionably discolor, or impart an objectionable odor to, or lessen the water resistance, electrical properties, mechanical strength and other useful properties of the cured aminoplast. The substances that are able to meet these requisites are extremely rare. Urea and various substituted ureas, phenols, aniline, toluene sulfonamides and acid bodies heretofore have been used or suggested as plasticizers for aminoplasts, but none has been entirely satisfactory. In most cases the improvement in plasticity was attained at the sacrifice of some other useful property. For example, the addition of urea decreases the water resistance of the molded article. Phenols impart color and odor, while aniline not only imparts color and odor but also retards the cure of the resin during molding.

The present invention is based on my discovery that compounds of the class described generically in the first paragraph of this specification meet the above-mentioned requirements for a plasticizer for aminoplasts. The described compounds not only effectively plasticize (internally plasticize) the heat-convertible aminoplast so that the aminoplast has good flow characteristics during molding, but they accomplish this result while at the same time yielding an intercondensation product of accelerated curing characteristics. This result was completely unexpected and obvious. Furthermore, the aminoplast is internally plasticized without any noticeable decrease in the other valuable properties of the heat-hardened aminoplast, such as heat- and water-resistance, dielectric strength, mechanical strength, surface appearance, color, odor, etc. Another advantage accruing from the use of these compounds is that they are able to intercondense with the potentially reactive aminoplast and, therefore, cannot "bleed" from the molding composition or the molded article since they become an integral part of the resin molecule. Also, a larger amount of plasticizer can be tolerated in the compositions than usually has been possible with conventionally plasticized aminoplasts, and yet not impair the water resistance of the molded article. These results were quite surprising and unexpected, since in no way could it have been predicted from the known properties of these salts or of aminoplasts that such compounds not only would serve effectively to plasticize the heat-curable aminoplast but would do this not only without retarding but actually accelerating its curing rate and without sacrifice of the useful properties of the cured aminoplast. This is all the more surprising when it is considered that closely related compounds, e. g., IV 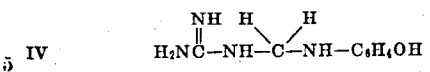

are entirely unsatisfactory, since not only do they cause serious discoloration but they also cause a material decrease in the water resistance of the finished molded or laminated article.

The salts with which aminoplasts are plasticized and by means of which accelerated curing characteristics are imparted to the heat-convertible aminoplast may be represented by the formula V 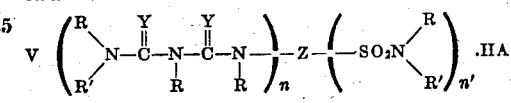

where R and R' represent a member of the class consisting of hydrogen and monovalent organic radicals (more particularly monovalent hydrocarbon radicals), at least one R' being hydrogen, at least one Y represents the grouping =NH and the other Y represents a member of the class consisting of oxygen, sulfur, selenium and the grouping NR'', where R'' has the same meaning as R, Z is a carbocyclic nucleus, $n$ and $n'$ are integers and are at least 1, the sum of $n$ and $n'$ ranging from 2 to the combining power of the carbocyclic nucleus, that is, to a maximum sum corresponding to the number of replaceable hydrogen atoms in the carbocyclic nucleus, and HA represents an organic or inorganic acid. HA may be one or more mol equivalents depending upon the reactivity of the chosen base with the particular acid. Instead of using the salts themselves in carrying the present invention into effect, in some cases it is advantageous to use the products obtained by reacting these salts with an aldehyde, e. g., formaldehyde.

With further reference to Formula V it is to be noted that R and R' may be hydrogen or a monovalent hydrocarbon radical, but at least one R' should be hydrogen in order more readily to intercondense and effectively to bind the salt with the aminoplast. Thus R may be either hydrogen or any substituted or unsubstituted hydrocarbon radical, for example: alkyl (e. g., methyl, ethyl, propyl, butyl, etc.); cycloaliphatic (e. g., cyclopentyl, cyclopentenyl, cyclohexyl, cyclohexenyl, cycloheptyl, etc.); aryl (e. g., phenyl, diphenyl, naphthyl, etc.); alkaryl (e. g., tolyl, xylyl, ethylphenyl, propylphenyl, etc.); aralkyl (e. g., benzyl, phenylethyl, phenylpropyl, etc.); heterocyclic (e. g., thienyl, pyrrolyl, furyl, tetrahydrofuryl, etc.); and their homologues and analogues, as well as those groups with one or more of their hydrogen atoms substituted by, for example, a halogeno, nitro, hydroxy, carbalkoxy, acetoxy, amido, imido, amino, imino, etc., substituent grouping. Z represents any carbocyclic nucleus. For example, Z may be the nucleus of an aromatic compound, e. g., a benzene nucleus, a naphthalene nucleus or an anthracene nucleus, or the nucleus of cycloaliphatic compounds such, for instance, as cyclopentane, cyclopentene, cyclohexane, cyclohexene, cycloheptane, cycloheptene, etc., or the nucleus of substituted aromatic or aliphatic compounds wherein one or more of the hydrogen atoms attached to the ring carbon atoms have been replaced by any other substituent, e. g., an atom or radical such as halogeno, nitro, hydroxy, carboxy, carbalkoxy, acyl, alkoxy, aroxy, aralkoxy, alkaroxy, amido, imido, alkyl, aryl, aralkyl, alkaryl, heterocyclic, hydrocyclic and substituted alkyl, aryl, aralkyl, alkaryl, heterocyclic and hydrocyclic radicals, e. g., the halogeno, nitro, hydroxy, carboxy, carbalkoxy, acyl, alkoxy, aroxy, aralkoxy, alkaroxy, amido, imido, amino and imino derivatives of such hydrocarbon radicals.

Illustrative examples of acids represented by HA in Formula V are hydrochloric, hydrobromic, nitric, sulfuric, phosphoric, boric, selenic, chromic, formic, acetic, chloracetic, propionic, valeric, caproic, acrylic, polyacrylic, methacrylic, polymethacrylic, oxalic, malonic, succinic, glutaric, adipic, lactic, tartaric, citric, malic, maleic, fumaric, itaconic, citraconic, benzoic, phthalic, salicylic, camphoric, etc.

Two classes of compounds (within the herein-described broad class) that may be used advantageously in carrying this invention into effect are the organic and inorganic salts (or the aldehyde-reaction products of the salts) of nuclearly poly-substituted carbocyclic compounds corresponding to the formula VI 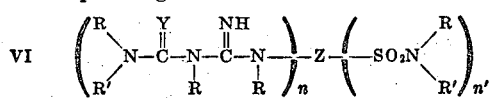

and

VII 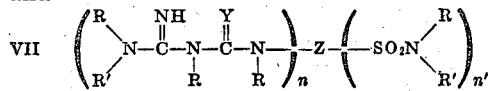

where R and and R' represent a member of the class consisting of hydrogen and monovalent hydrocarbon radicals, at least one R' being hydrogen. Y represents a member of the class consisting of oxygen, sulfur, selenium and the grouping =NR'', where R'' has the same meaning as R, Z is a carbocyclic nucleus, $n$ and $n'$ are integers and are at least 1, the sum of $n$ and $n'$ ranging from 2 to the number of replaceable hydrogen atoms in the carbocyclic nucleus.

More specific examples of salts of nuclearly poly-substituted carbocyclic compounds that may be used to plasticize aminoplasts, e. g., urea-formaldehyde resins, melamine-formaldehyde resins, urea-melamine-formaldehyde resins, etc., and to accelerate the conversion of the heat-convertible aminoplast to an insoluble, infusible state are compounds corresponding to the following formulas:

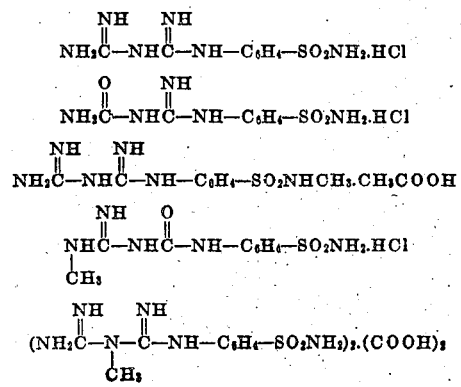

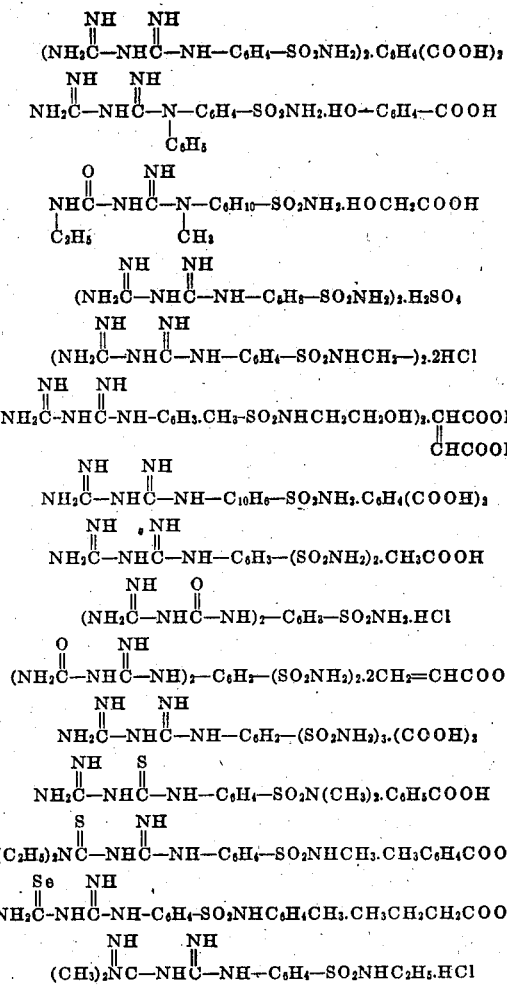

Additional examples of compounds that may be employed are the aldehyde, specifically formaldehyde, reaction products of compounds such as above mentioned by way of illustration and wherein the

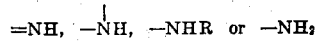

groups are converted into alkylol, specifically methylol, derivatives, e. g., =N—CR₂OR, or into alkylene, specifically methylene, derivatives, e. g., —N=CR₂, where R is hydrogen, alkyl, aryl, alkaryl, aralkyl, etc., as described above with reference to R in Formulas I and II. Other examples of salts and their aldehyde-reaction products that may be employed in carrying my invention into effect are given in my copending application Serial No. 380,671, filed concurrently herewith and assigned to the same assignee as the present invention.

In order that those skilled in the art better may understand how the present invention may be carried into effect, the following illustrative examples thereof are given. All parts are by weight.

*Example 1*

An aminoplast was prepared from the following components:

| | Parts |
|---|---|
| Urea | 900.0 |
| Aqueous solution of formaldehyde (approx. 37.1% HCHO) | 2250.0 |
| Aqueous ammonia (29.5% NH₃) | 100.0 |
| Sodium hydroxide in a small amount of water | 0.93 |

The above components were heated under reflux at the boiling temperature of the mass for 2½ hours, yielding a resinous syrup having a pH of 7.05 and containing 46% resin solids. When a small sample of this syrup was heated on a 140° C. hot plate it did not cure to an insoluble, infusible state.

Twenty-five parts of the above syrup were mixed with 0.23 part biguanido sulfanilamide hydrochloride (hydrochloride salt of p-biguanidobenzenesulfonamide), which amount is equal to approximately 2% of the solid resin content of the resin syrup. This mixture was heated for 10 minutes under reflux to cause the biguanido sulfanilamide hydrochloride to intercondense with the ureaformaldehyde partial condensation product. At the end of the reflux period the pH of the syrup was 5.9. This syrup was heat-curable (thermosetting) as evidenced by the fact that it converted rapidly to an insoluble, infusible state when a small sample of it was heated on a 140° C. hot plate.

A molding (moldable) compound was prepared from the heat-curable syrup by incorporating therewith 7.5 parts alpha cellulose in flock form and 0.1 part of a mold lubricant, specifically zinc stearate. This compound was dried at 60° C. until sufficiently moisture-free for molding. A part of the dried compound was molded for 5 minutes at 135° C. under a pressure of 2,000 pounds per square inch. The molded piece was well cured throughout and was translucent in nature. The molded article showed good flow characteristics during molding. It had a high gloss.

To observe the effect of an additional quantity of biguanido sulfanilamide hydrochloride (biguanido benzene sulfonamide hydrochloride) on the molding characteristics of the compound, 4 parts of the dried molding compound obtained as described above were mixed with 0.072 part of biguanido sulfanilamide hydrochloride, which increased the biguanido sulfanilamide hydrochloride from 2% to 5% based on the resin solids. When the resulting mixture was molded for 5 minutes at 135° C. and 2,000 pounds per square inch pressure, it showed increased flow during molding and the molded article was more translucent as compared with the composition containing 2% biguanido sulfanilamide hydrochloride. The molded article was excellently cured throughout and had a good surface appearance.

Example 2

Twelve and one-half parts of a urea-formaldehyde resin syrup prepared as described under Example 1 were mixed with 2.05 parts of solid, thermosetting melamineformaldehyde resin and 0.23 part biguanido sulfanilamide hydrochloride, which amount is equal to approximately 3% of the solid resin content of the mixture. The mixture was heated under reflux for 10 minutes at the boiling temperature of the mass, yielding a resinous syrup having a pH of 5.95. This syrup cured rapidly to an insoluble, infusible or C-stage when a small sample of it was heated on a 140° C. hot plate.

A molding compound was prepared by mixing the above syrup with 5.2 parts alpha flock and 0.09 part zinc stearate, followed by drying the mixture at 60° C. The dried compound was molded for 5 minutes at 135° C. under a pressure of 2,000 pounds per square inch, yielding well-cured molded pieces that were hard, shiny and translucent.

Example 3

This example illustrates the suitability of the hereindescribed salts as a plasticizer and as a supplementary accelerator of curing of thermosetting molding compositions comprising a heat-convertible aminoplast obtained by intercondensing a curing reactant, specifically chloracetamide, with a partial condensation product of, for example, urea and formaldehyde.

A urea-formaldehyde resin syrup was prepared as described under Example 1. To this syrup was added 22.5 parts chloracetamide dissolved in 85 parts water and the mixture was heated under reflux for 10 minutes to cause the chloracetamide to intercondense with the urea-formaldehyde partial condensation product. Fifteen hundred parts of the resulting syrup were mixed with 800 parts of a cellulosic filler ("Plasticell" paper) and 11.5 parts zinc stearate. The wet compound was dried at 80° C., ground in a hammer mill and then ball milled for 12 hours.

A portion of the dried, ground and milled compound was mixed with 3% by weight thereof of biguanido sulfanilamide hydrochloride and then molded for 5 minutes at 135° C. under a pressure of 2,000 pounds per square inch. The molded piece showed improved flow characteristics during molding as compared with a similar molding compound from which the biguanido sulfanilamide hydrochloride was omitted. The molded article was excellently cured throughout and the translucency, too, was excellent. The color of the cured, molded article also was very good. Substantially the same results were obtained when 5% by weight of biguanido sulfanilamide hydrochloride was incorporated into the dried molding compound.

Practically the same results as above described are obtained when a melamine-formaldehyde partial condensation product is used instead of a partial condensation product of urea and formaldehyde.

Other examples of aminoplasts that may be plasticized with the hereindescribed salts, or with aldehyde-reaction products thereof, or with mixtures of the salts and their aldehyde-reaction products are reaction products of an aldehyde, including polymeric aldehydes and aldehyde-addition products, with resin-forming amido, imido, amino or imino compounds, or suitable mixtures thereof, for instance urea, thiourea, diurea, hydroxy urea, ethanol urea, unsymmetrical diphenyl urea, diethylene triurea, methyl urea, acetyl urea, phenyl thiourea, asymmetrical diethyl urea, allyl urea, 2-chlorallyl urea, ethylidene urea, methylol ureas, methylene ureas, dicyandiamide, guanyl urea, guanyl selenourea, guanyl thiourea, biguanidine, aminodiazines, aminopentadiazines (aminodiazoles), aminotriazines (e. g., melamine, ammeline, ammelide, etc.), aminotriazoles (e. g., guanazoles), creatinine, guanoline, etc. In many cases the use of an aminotriazine, e. g., melamine, alone or in conjunction with other amido, amino, imido or imido compounds, yields particularly valuable aminoplasts that may be internally modified in accordance with the present invention. Illustrative examples of aminotriazines that may be employed are given in various copending applications of mine, for example in copending application Serial No. 365,379, filed November 12, 1940, and assigned to the same assignee as the present invention. Suitable mixtures of aminotriazines also may be employed. All of these amido, imido, amino and imino compounds (amidogen compounds) are aldehyde-reactable and all contain at least one active

group.

Aldehydes other than formaldehyde or compounds engendering formaldehyde also may be employed in producing the aminoplast, for instance acetaldehyde, propionaldehyde, butyraldehyde, acrolein, methacrolein, crotonaldehyde, benzaldehyde, furfural, etc., mixtures thereof, or mixtures of formaldehyde (or compounds engendering formaldehyde) with such aldehydes. As aminoplasts I prefer to use potentially heat-curable resinous reaction products of ingredients comprising, for example, urea and formaldehyde, or an aminotriazine (e. g., melamine) and formaldehyde, or urea, melamine and formaldehyde, or an aminotriazole (e. g., guanazole, phenyl guanazole, etc.), urea and/or melamine and formaldehyde, or an aminodiazine (e. g., 2,4,6-triaminopyrimidine, 2,4-diaminoquinazoline, etc.), urea and/or melamine and formaldehyde. The hereindescribed salts, or aldehyde-reaction products thereof or mixtures of salts and aldehyde-reaction products may be incorporated into the resin along with the other reactants, or during or after formation of the partial condensation product of the primary components, or during the preparation of the molding composition. For example, the plasticizer component may be incorporated into the resin or molding composition as described more specifically in, for example, my copending application Serial No. 346,962, filed July 23, 1940, with particular reference to suitable technique for incorporating a malonic ester into an aminoplast composition. The potentially heat-convertible aminoplasts and molding compositions containing the same may be prepared as described in the above-identified copending application and in various other copending applications, for example, application Serial No. 363,036, filed October 26, 1940, and assigned to the same assignee as the present invention.

The amount of the hereindescribed plasticizer reactant which is incorporated into the potentially reactive aminoplast or molding composition made therefrom may be varied as desired or as conditions may require, but ordinarily the plasticizer reactant is employed in an amount corresponding to from 0.1 to 10 or 12% by weight of the aminoplast, from 0.5 to 4 or 5% being generally satisfactory for the usual heat-curable aminoplasts.

Thermosetting molding compositions comprising heat-curable or potentially heat-curable aminoplasts plasticized with the above-described salts, aldehyde-reaction products of salts or mixtures of salts and their aldehyde-reaction products may be molded into a variety of shapes under heat and pressure, more particularly at temperatures of the order of 100° to 200° C., preferably from approximately 120° to 180° C. The plasticized compositions show good plastic flow during molding. Molded articles of manufacture comprising the molded heat-hardened molding compositions of this invention have a good surface finish, show no evidence of "bleeding" plasticizer, are well cured throughout and show no appreciable loss in any of their other useful properties.

What I claim as new and desire to secure by Letters Patent of the United States is:

1. A composition of matter comprising a heat-curable aminoplast modified with at least one compound of the class consisting of (1) the salts of nuclearly poly-substituted carbocyclic compounds wherein at least one of the nuclear substituents is a grouping represented by the formula

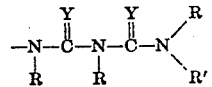

and at least one of the other nuclear substituents is a grouping represented by the formula

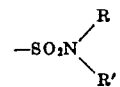

R and R' in each of the above formulas representing a member of the class consisting of hydrogen and monovalent hydrocarbon radicals but at least one R' being hydrogen, at least one Y representing the grouping =NH and the other Y representing a member of the class consisting of oxygen, sulfur, selenium and the grouping =NR'', where R'' has the same meaning as R; and (2) the aldehyde-reaction products of the salts of (1).

2. A composition as in claim 1 wherein the aminoplast is a heat-curable condensation product of ingredients comprising urea and formaldehyde.

3. A composition as in claim 1 wherein the aminoplast is a heat-curable condensation product of ingredients comprising an aminotriazine and formaldehyde.

4. A composition comprising a heat-curable aminoplast modified with an organic salt of a biguanido benzene sulfonamide.

5. A composition comprising a heat-curable aminoplast modified with an inorganic salt of a biguanido benzene sulfonamide.

6. A heat-curable composition comprising a heat-convertible reaction product of ingredients comprising urea, formaldehyde and a salt of a biguanido carbocyclic sulfonamide.

7. A product comprising the heat-cured composition of claim 6.

8. A composition comprising the resinous reaction product of ingredients comprising urea, formaldehyde and a salt of a biguanido benzene sulfonamide.

9. A composition comprising the resinous reaction product of ingredients comprising melamine, formaldehyde and a salt of a biguanido benzene sulfonamide.

10. A heat-hardenable molding composition comprising (1) a filler, (2) a potentially reactive condensation product of ingredients comprising urea and formaldehyde and (3) a salt of biguanido sulfanilamide.

11. An article of manufacture comprising the heat-hardened molding composition of claim 10.

12. The method which comprises causing to react under heat with a potentially reactive aminoplast at least one compound of the class consisting of (1) the salts of nuclearly poly-substituted carbocyclic compounds wherein at least one of the nuclear substituents is a grouping represented by the formula

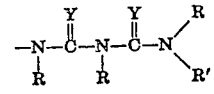

and at least one of the other nuclear substituents is a grouping represented by the formula

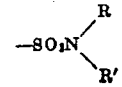

R and R' in each of the above formulas representing a member of the class consisting of hydrogen and monovalent hydrocarbon radicals but at least one R' being hydrogen, at least one Y representing the grouping =NH and the other Y representing a member of the class consisting of oxygen, sulfur, selenium and the grouping =NR'', where R'' has the same meaning as R; and (2) the aldehyde-reaction products of the salts of (1).

13. The method which comprises forming a partial condensation product of ingredients comprising urea and formaldehyde, and causing a salt of biguanido sulfanilamide to react under heat with the said partial condensation product.

14. A composition comprising a resin having incorporated therein a salt of a biguanido carbocyclic sulfonamide, said resin being a condensation product of ingredients comprising an amidogen compound and an aldehyde.

15. A composition comprising a resin having incorporated therein a salt of a biguanido benzene sulfonamide, said resin being a condensation product of ingredients comprising an amidogen compound and formaldehyde.

16. A composition comprising a resin having incorporated therein an inorganic salt of a biguanido benzene sulfonamide, said resin being a condensation product of ingredients comprising a urea and an aldehyde.

17. A composition comprising a resin having incorporated therein an inorganic salt of biguanido sulfanilamide, said resin being a condensation product of ingredients comprising urea and formaldehyde.

GAETANO F. D'ALELIO.

CERTIFICATE OF CORRECTION.

Patent No. 2,331,377. October 12, 1943.

GAETANO F. D'ALELIO.

It is hereby certified that error appears in the printed specification of the above numbered patent requiring correction as follows: Page 1, second column, line 30, after "guanido)" strike out the comma; page 2, first column, line 60-61, for the word "obvious" read --unobvious--; page 3, first column, line 41, for "R and and" read --R and--; and that the said Letters Patent should be read with this correction therein that the same may conform to the record of the case in the Patent Office.

Signed and sealed this 14th day of December, A. D. 1943.

(Seal)

Henry Van Arsdale,
Acting Commissioner of Patents.